United States Patent
Sedzin et al.

(10) Patent No.: US 9,474,031 B1
(45) Date of Patent: Oct. 18, 2016

(54) METHOD AND SYSTEM FOR PERFORMING FOREIGN OBJECT DETECTION IN AN INDUCTIVE WIRELESS POWER TRANSFER SYSTEM

(71) Applicant: NXP B.V., Eindhoven (NL)

(72) Inventors: Aliaksei Vladimirovich Sedzin, Eindhoven (NL); Klaas Brink, Waalre (NL); Rene Geraets, Eindhoven (NL); Patrick Niessen, Eindhoven (NL); Oswald Moonen, Eindhoven (NL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 0 days.

(21) Appl. No.: 14/688,886

(22) Filed: Apr. 16, 2015

(51) Int. Cl.
| | |
|---|---|
| *H04B 5/00* | (2006.01) |
| *H04W 52/24* | (2009.01) |
| *H02J 5/00* | (2016.01) |
| *H02J 17/00* | (2006.01) |
| *H02J 7/02* | (2016.01) |

(52) U.S. Cl.
CPC ............ *H04W 52/243* (2013.01); *H02J 5/005* (2013.01); *H02J 7/025* (2013.01); *H02J 17/00* (2013.01); *H04B 5/0037* (2013.01); *H04B 5/0087* (2013.01)

(58) Field of Classification Search
CPC .......... H02J 5/005; H02J 7/025; H02J 17/00; H02J 2007/0001; H02J 2007/0096; H02J 5/00; H02J 7/00; H02J 7/0004; H04B 5/0037; H04B 5/0081; H04B 5/0075; H04B 5/0093; H04B 5/0062; H04B 5/0068
See application file for complete search history.

(56) References Cited

U.S. PATENT DOCUMENTS

| | | | |
|---|---|---|---|
| 2013/0094598 A1* | 4/2013 | Bastami ................. | H02J 5/005 375/259 |
| 2013/0307348 A1 | 11/2013 | Oettinger et al. | |
| 2014/0084857 A1* | 3/2014 | Liu ......................... | H02J 7/025 320/108 |
| 2015/0097442 A1* | 4/2015 | Muurinen ............ | H04B 5/0037 307/104 |

OTHER PUBLICATIONS

Heebl, Jason Daniel; "Development and Characterization of a Tunable Resonant, Shielded Loop Wireless Non-Radiative Power Transfer System"; 137 pgs.; 2011.

Finkenzeller, Klaus; "The RFID Handbook: Fundamentals and Applications in Contactless Smart Cards and Identification Second edition"; 2003.

(Continued)

*Primary Examiner* — Golam Sorowar

(57) ABSTRACT

A method for performing foreign object detection in an inductive wireless power transfer system is disclosed. In the embodiment, the method involves obtaining measurements from a base station of a wireless power transfer system during charging and determining transmitter energy loss in a power transmitter, $P_{txloss}$, using the obtained measurements, wherein the transmitter energy loss, $P_{txloss}$, is a function of at least $V_{cap}$ and $P_{Tx}$, wherein $V_{cap}$ is proportional to the voltage amplitude across the capacitor of an LC tank circuit in a power transmitter and $P_{Tx}$ is the total power supplied to the power transmitter. The method also involves detecting the presence of a foreign object in response to the estimated transmitter energy loss.

17 Claims, 5 Drawing Sheets

(56) References Cited

OTHER PUBLICATIONS

Qi v.1.1.2 specification—Part 1; http://www.wirelesspowerconsortium.com/; Last visited Aug. 28, 2014.

"Numerical Methods Lecture 5—Curve fitting techniques"; http://kobus.ca/seminars/ugrad/NM5_curve_s02.pdf; 14 pgs.; Last visited Aug. 28, 2014.

AVID Technologies, Inc., http://www.avid-tech.com/wirelesspower/qi-fod-receiver.php (last visited Apr. 15, 2015).

Niknejad, Ali M., Electromagnetics for High-Speed Analog and Digital Communications Circuits, 195-232 (Cambridge University Press 2007).

Kuyvenhoven, Neil et al.; "Development of a Foreign Object Detection and Analysis Method for Wireless Power Systems"; IEEE; 6 pgs; 2011.

\* cited by examiner

METHOD AND SYSTEM FOR PERFORMING FOREIGN OBJECT DETECTION IN AN INDUCTIVE WIRELESS POWER TRANSFER SYSTEM

TECHNICAL FIELD

The present specification relates to a method and system for performing foreign object detection in an inductive wireless power transfer system.

BACKGROUND

The Qi standard, as developed by the Wireless Power Consortium, is a standard for use with inductive wireless power transfer (IWPT) systems. Part of the Qi v.1.1.2 standard is a safety function referred to as Foreign Object Detection (FOD) with the purpose to detect non-Qi power reception devices (e.g., a coin, paperclip, metal foil, etc.) interfering with power transfer between a Qi power transmission device and a Qi power reception device. A foreign object that dissipates part of the transmitted energy can be a safety hazard because power dissipation into the non-Qi power reception device may cause the temperature of the non-Qi power reception device to increase to a very high temperature and/or cause an incident such as a fire.

SUMMARY

In an embodiment, a method for performing foreign object detection in an inductive wireless power transfer system is disclosed. In the embodiment, the method involves obtaining measurements from a base station of a wireless power transfer system during charging and determining transmitter energy loss in a power transmitter, $P_{txloss}$, using the obtained measurements, wherein the transmitter energy loss, $P_{txloss}$, is a function of $V_{cap}$ and $P_{Tx}$, wherein $V_{cap}$ is proportional to the voltage amplitude across the capacitor of an LC tank circuit in a power transmitter and $P_{Tx}$ is the total power supplied to the power transmitter. The method also involves detecting the presence of a foreign object in response to the estimated transmitter energy loss.

In an embodiment, $P_{txloss}$ is determined using a two-variable model defined by the equation $a*V_{cap}^2+b*P_{Tx}+c$, wherein $V_{cap}$ and $P_{Tx}$ are the measurements obtained from the base station of the wireless power transfer system.

In another embodiment, the two-variable model is generated by: obtaining measurements of the wireless power transfer system in various operating conditions; generating data points based on the measurements; and performing curve fitting on the generated data points to generate the predetermined coefficients of the two-variable model.

In another embodiment, the method further involves performing a curve fitting by deriving values for the coefficients of the two-variable model such that the resulting curve has a root mean square error value equal to sixty mW or less.

In another embodiment, the presence of a foreign object is detected if $P_{fo}$ exceeds a certain threshold when using the value of $P_{txloss}$ to solve for $P_{fo}$ using the equation:

$$P_{Tx}=P_{txloss}+P_{fo}+(P_{rxloss}+P_{rxload})$$

where $P_{Tx}$ represents the total power supplied to the power transmitter, $P_{txloss}$ represents the losses in the power transmitter itself, $P_{fo}$ represents the power dissipation in a foreign object, $P_{rxloss}$ represents the power losses in the power receiver, and $P_{rxload}$ represents the net power delivered to the load.

In another embodiment, the presences of a foreign object is detected if $P_{fo}$ exceeds 300 mW by 10%.

In another embodiment, at least one of the coefficients of the two-variable model is adjusted based on the type of a coil within of the transmitter.

In another embodiment, the inductive wireless power transfer system includes a Qi transmitter.

In another embodiment, the coefficients b and c are fixed in firmware of the wireless power transfer system.

In another embodiment, $V_{cap}$ is the peak voltage over a capacitor within the power transmitter.

In a second embodiment, an inductive wireless power transfer system is disclosed. In the embodiment, the inductive wireless power transfer system includes, a base station made up of a system unit and at least one power transmitter coupled to the system unit, the at least one power transmitter having a power conversion unit and a communications and control unit, wherein the inductive power transfer system is configured to perform foreign object detection, foreign object detection involving obtaining measurements from a base station of the inductive wireless power transfer system during charging and determining transmitter energy loss in a power transmitter, $P_{txloss}$, using the obtained measurements, wherein the transmitter energy loss, $P_{txloss}$, is a function of $V_{cap}$ and $P_{Tx}$, wherein $V_{cap}$ is proportional to the voltage amplitude across the capacitor of an LC tank circuit in a power transmitter and $P_{Tx}$ is the total power supplied to the power transmitter. Foreign object detection further involves detecting the presence of a foreign object in response to the estimated transmitter energy loss.

In another embodiment, $P_{txloss}$ is determined using a two-variable model defined by the equation $a*V_{cap}^2+b*P_{Tx}+c$ wherein $V_{cap}$ and $P_{Tx}$ are the measurements obtained from the base station of the wireless power transfer system.

In another embodiment, the two-variable model is generated by obtaining measurements of the wireless power transfer system in various operating conditions; generating data points based on the measurements; and performing curve fitting on the generated data points to generate the two-variable model.

In another embodiment, foreign object detection further involves performing a curve fitting by deriving values for the coefficients of the two-variable model such that the resulting curve has a root mean square error value equal to sixty mW or less.

In another embodiment, the presence of a foreign object is detected if $P_{fo}$ exceeds a certain threshold when using the value of $P_{txloss}$ to solve for $P_{fo}$ using the equation:

$$P_{Tx}=P_{txloss}+P_{fo}+(P_{rxloss}+P_{rxload})$$

where $P_{Tx}$ represents the total power supplied to the power transmitter, $P_{txloss}$ represents the losses in the power transmitter itself, $P_{fo}$ represents the power dissipation in a foreign object, $P_{rxloss}$ represents the power losses in the power receiver, and $P_{rxload}$ represents the net power delivered to the load.

In another embodiment, the presences of a foreign object is detected if $P_{fo}$ exceeds 300 mW by 10%.

In another embodiment, the inductive wireless power transfer system includes a Qi transmitter.

In another embodiment, the coefficients b and c are fixed in firmware of the wireless power transfer system.

In a third embodiment, a non-transitory computer-readable storage medium storing instructions to be executed by a computerized system is disclosed. In the embodiment, the instructions are for obtaining measurements from a base station of a wireless power transfer system during charging and determining transmitter energy loss in a power transmitter, $P_{txloss}$, using the obtained measurements, wherein the transmitter energy loss, $P_{txloss}$, is a function of $V_{cap}$ and $P_{Tx}$, wherein $V_{cap}$ is proportional to the voltage amplitude across the capacitor of an LC tank circuit in a power transmitter and $P_{Tx}$ is the total power supplied to the power transmitter. Foreign object detection further involves detecting the presence of a foreign object in response to the estimated transmitter energy loss.

In another embodiment, $P_{txloss}$ is determined using a two-variable model defined by the equation $a*V_{cap}^2 + b*P_{Tx} + c$ wherein $V_{cap}$ and $P_{Tx}$ are the measurements obtained from the base station of the wireless power transfer system.

Other aspects and advantages of embodiments of the present invention will become apparent from the following detailed description taken in conjunction with the accompanying drawings.

BRIEF DESCRIPTION OF THE DRAWINGS

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
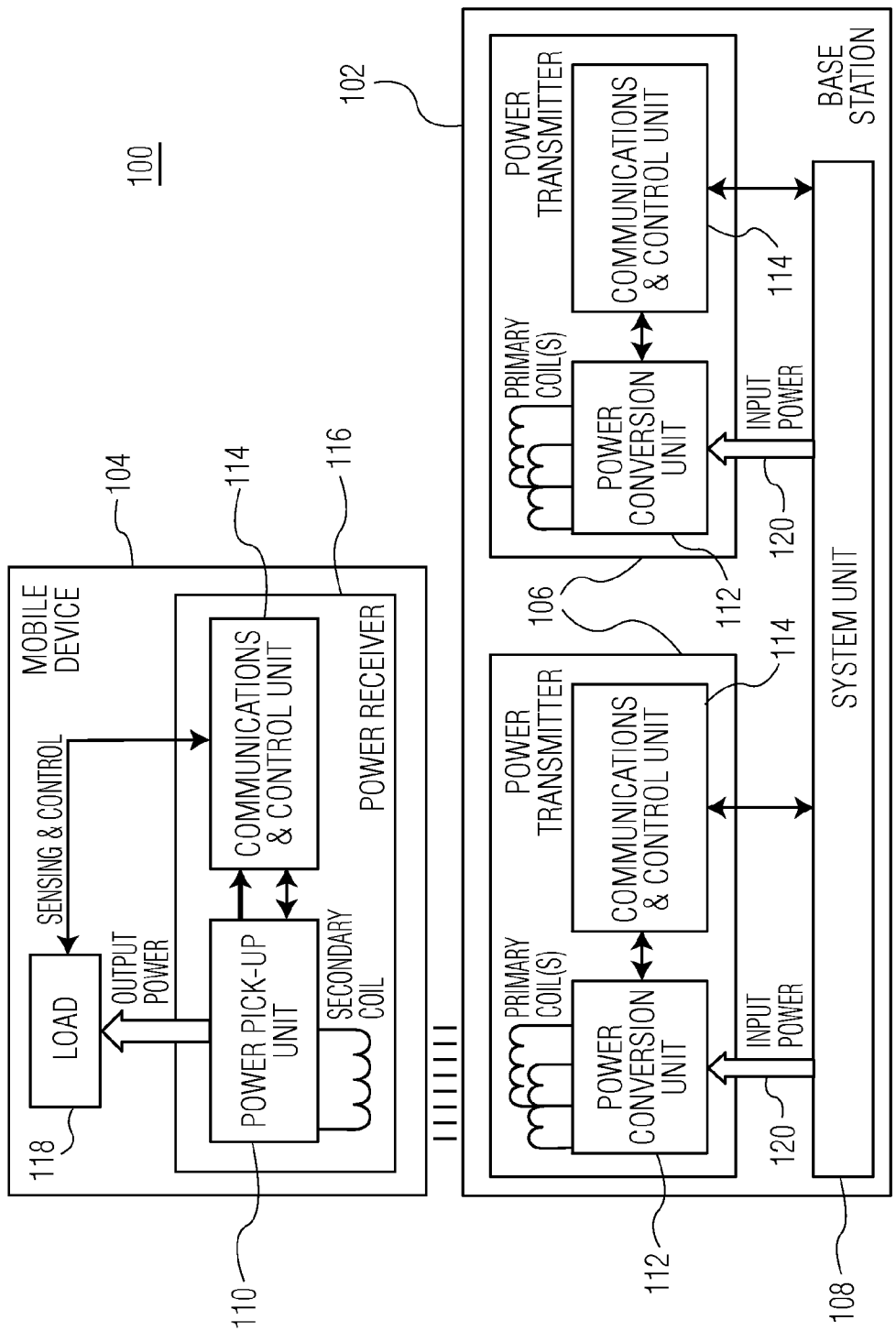
FIG. 1 depicts an inductive wireless power transfer system (IWPT system) that includes a base station and a mobile device in close proximity to the base station.

FIG. 1 depicts an inductive wireless power transfer system (IWPT system) 100 that includes a base station 102 and a mobile device 104 in close proximity to the base station. The base station includes two power transmitters 106 coupled to a system unit 108 and the mobile device 104 includes a power receiver 116 and a load 118 (e.g., a rechargeable battery). In an embodiment, the power transmitters of the base station include a power conversion unit 112 and a communications and control unit 114 and the power receiver of the mobile device includes a power pick-up unit 110 and a communications and control unit 114. In an embodiment, the system unit of the base station includes rules and logic for controlling the behavior of the power transmitters and provides input power 120 to the transmitters. The base station can include more than one power transmitter and, although only one mobile device is shown, each power transmitter can be paired with a different mobile device such that the base station can charge a number of mobile devices equal to the number of power transmitters in the base station. In an embodiment, the power conversion unit of the base station and the power pick-up unit of the mobile device include coils by which power can be transmitted or received and the respective communications and control units include a communications interface by which the mobile device can communicate with the base station and by which the power transmitter can communicate with the system unit of the base station or with another part of the base station. The base station depicted in FIG. 1 is shown with two power transmitters, but only the left power transmitter is paired with a mobile device. In an embodiment, the mobile device can communicate with the base station to perform, for example, authentication, authorization, or other verification procedures to establish the identity of the mobile device (e.g., the user of the mobile device) before power is transmitted. In an embodiment, the mobile device sends all communications "in-band" to the base station (e.g., all communications are sent using the Qi protocol). The mobile device may also communicate with the base station using another band of communication (e.g., wi-fi, GSM/CDMA, Bluetooth, NFC, etc.).

Figure 2:
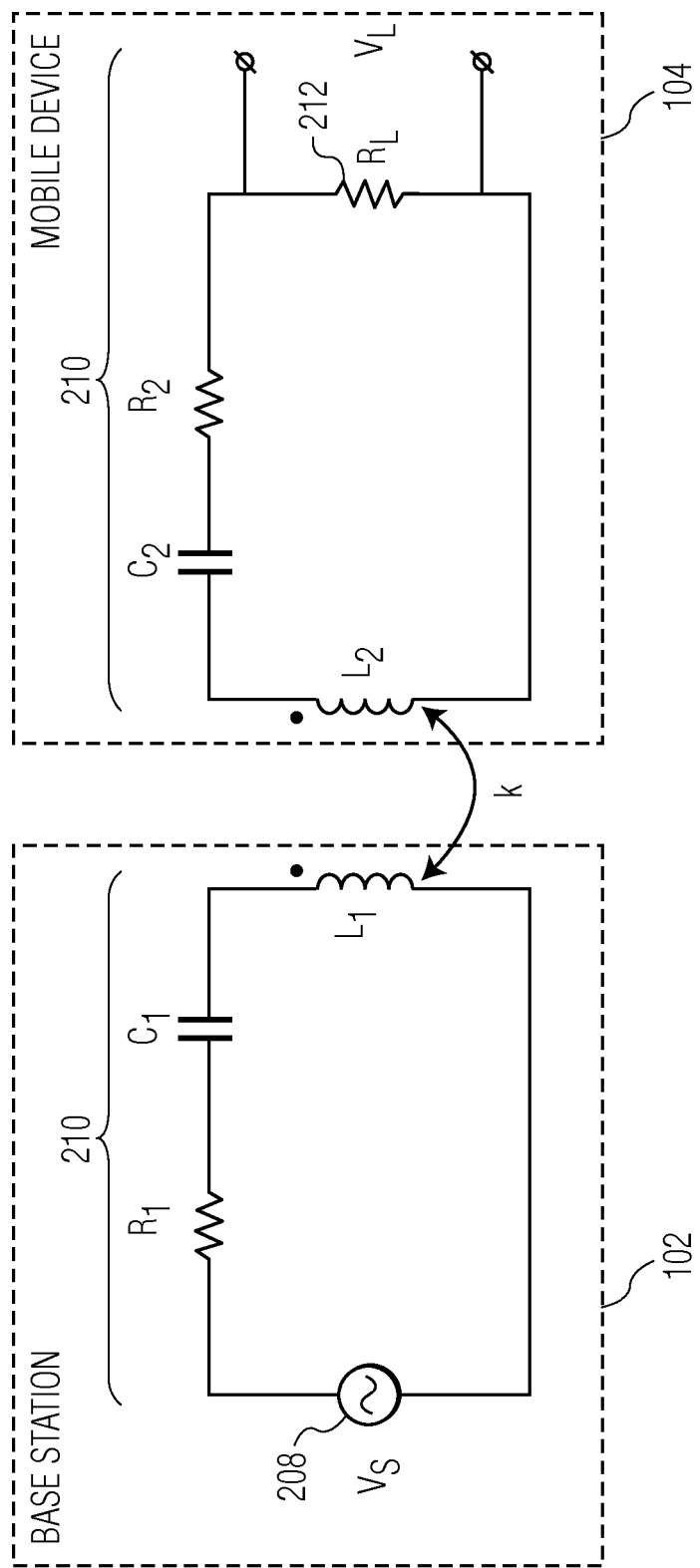
FIG. 2 depicts a simplified model of an IWPT system.

FIG. 2 depicts a simplified model of an IWPT system. In an embodiment, the base station can be modeled as a voltage source ($V_s$) 208 connected to a circuit 210 that includes a resistor ($R_1$), an inductor ($L_1$), and a capacitor (CO. The resistor represents power loss in the base station, the capacitor represents the capacitance across the base station and the inductor represents the coil. Similarly, in an embodiment, the mobile device can be modeled as a circuit 210 formed by a resistor ($R_2$), an inductor ($L_2$), and a capacitor ($C_2$) connected to a second resistor ($R_L$) 212. Again, the resistor represents power loss in the mobile device, the capacitor represents the capacitance across the mobile device, the inductor represents the coil, and the second resistor represents a load (e.g., a rechargeable battery). In an embodiment, the voltage source includes an interface, such as a power cord (not shown), for receiving power at the base station from an external source, such as a mains source.

In accordance with the Qi standard, the base station or the mobile device should be able to determine if a foreign object is present between the base station and the mobile device. Typically, the determination that a foreign object is present between the base station and the mobile device is made by comparing the power output of the power conversion unit and the power input of the power pick up unit. If the difference between the power output of the power conversion unit and the power input of the power pick up unit exceeds a certain threshold, the system can presume the presence of a foreign object and disable charging. For example, if the power output of the power conversion unit and the power input of the power pick up unit differ by more than 300 mW, the presence of a foreign object can be presumed and charging can be disabled.

The total amount of power in an IWPT system is conserved and can be expressed by the following equation:

$$P_{Tx} = P_{txloss} + P_{fo} + (P_{rxloss} + P_{rxload})$$

where $P_{Tx}$ represents the total power supplied to the power transmitter, $P_{txloss}$ represents the losses in the power transmitter itself, $P_{fo}$ represents the power dissipation in a foreign object, $P_{rxloss}$ represents the power losses in the power receiver, and $P_{rxload}$ represents the net power delivered to the load. Thus, any of the variables in the equation can be solved for by rearranging the equation. For example, in order to determine the amount of power dissipating into a foreign object ($P_{fo}$) the equation can be rearranged as follows:

$$P_{fo} = P_{Tx} - P_{txloss} - (P_{rxloss} + P_{rxload})$$

In an embodiment, $P_{Tx}$ is easily determined (e.g., by measuring the voltage supplied by a voltage source and the current consumed by a power transmitter as described below) and $P_{rxloss} + P_{rxload}$ are reported back to the base station by the mobile device, while determining $P_{txloss}$ can be difficult. Typically, determining $P_{txloss}$ involves the use of complex equations to estimate $P_{txloss}$ and/or additional circuitry to measure the current through a transmitter coil to calculate $P_{txloss}$. Additionally, the transmitter power loss, $P_{txloss}$, must be accurately determined (e.g., within sixty mW or less) in order to accurately solve for $P_{fo}$ or else a false positive may occur. Typical complex models for determining $P_{txloss}$ increase processing time and any additional components needed for measuring current through a transmitter coil take up space on a printed circuit board (PCB) and increase production costs. The additional time and space can reduce the effectiveness of foreign object detection and increase the risk that the presence of a foreign object will not be timely detected.

In accordance with an embodiment of the invention, a method for performing foreign object detection in an inductive wireless power transfer system is disclosed. In the embodiment, the method involves obtaining measurements from a base station of a wireless power transfer system during charging and determining transmitter energy loss in a power transmitter, $P_{txloss}$, using the obtained measurements, wherein the transmitter energy loss, $P_{txloss}$, is a function of at least $V_{cap}$ and $P_{Tx}$, wherein $V_{cap}$ is proportional to the voltage amplitude across the capacitor of an LC tank circuit in a power transmitter and $P_{Tx}$ is the total power supplied to the power transmitter. In an embodiment, $P_{txloss}$ is related to the current and frequency of the LC tank circuit. For example, if the voltage of the inductor is 100V and the current is 10 A, then $V_{cap}$ will be 2.7V. The method also involves detecting the presence of a foreign object in response to the estimated transmitter energy loss. In an embodiment, $P_{txloss}$ is determined using only $V_{cap}$ and $P_{Tx}$ in a two variable model defined by the equation:

$$a*V_{cap}^2 + b*P_{Tx} + c$$

wherein a, b, and c are predetermined coefficients. Accordingly, because the model only uses two variables ($V_{cap}$ and $P_{Tx}$), the model has a relatively low degree of complexity compared to typical models and additional components for determining current through a transmitter coil are not needed. Thus, $P_{txloss}$ can be easily determined, along with $P_{Tx}$ and $P_{rxloss} + P_{rxload}$ allowing for $P_{fo}$ to be more easily determined.

In operation, wireless charging is performed by placing a mobile device in close proximity to a power transmitter in a base station. In an embodiment, charging occurs when current is running through the primary coil of the power conversion unit. Once charging begins, the base station of the IWPT system obtains measurements from the mobile device (e.g., $P_{rxloss} + P_{rxload}$) via the communications and control unit of the mobile device as well as measurements from the power transmitter (e.g., $V_{cap}$ and $P_{Tx}$) via the communications and control unit of the power transmitter. In an embodiment, $P_{Tx}$ is obtained by multiplying input current with input voltage in a microcontroller. In an embodiment, input current is measured via an input current measurement circuit and input voltage is measured via an input voltage measurement circuit. In an embodiment, the input current measurement circuit and the input voltage measurement circuit are connected to analog-to-digital converter inputs (ADC inputs) of a microcontroller. The current measurement can be derived, for example, from the voltage drop over a precision resistor in series with a supply voltage source. In an embodiment, the voltage measurement circuit can be implemented as a resistor voltage divider. In an embodiment, $V_{cap}$ is obtained from an analog-to-digital converter directly connected to the microcontroller. The system unit then applies the measurements to the two-variable model to determine $P_{txloss}$ and uses $P_{txloss}$ to calculate $P_{fo}$. In an embodiment, if $P_{fo}$ exceeds a threshold, the system unit can initiate an action, such as directing the power transmitter to disable charging. In an embodiment, charging remains disabled until the foreign object is removed. In another embodiment, if $P_{fo}$ exceeds a threshold, the system unit can reduce the transmitted power to insure that $P_{fo}$ does not exceed a certain threshold (e.g., 300 mW).

In an embodiment, the two-variable model can be created by performing curve-fitting over data points generated from measurements taken on the IWPT system using MATLAB™ or other mathematical calculation and simulation tools. In an embodiment, the model can be generated by performing measurements on an IWPT system under various operating conditions (e.g., placement of the mobile device on the base station, voltage used in the system, or load in the system), generating data points based on the measurements, performing curve-fitting on the generated data points, and tuning the resulting polynomial for the curve based on the type of the IWPT system (e.g. an IWPT system using an A10 or A6 coil configuration as well as any Qi standardized IWPT systems). In other embodiments, a model using more than just two variables (i.e., $V_{cap}$ and $P_{Tx}$) can be used in the model. The additional variables may be used to increase the accuracy of the model.

Figure 3:
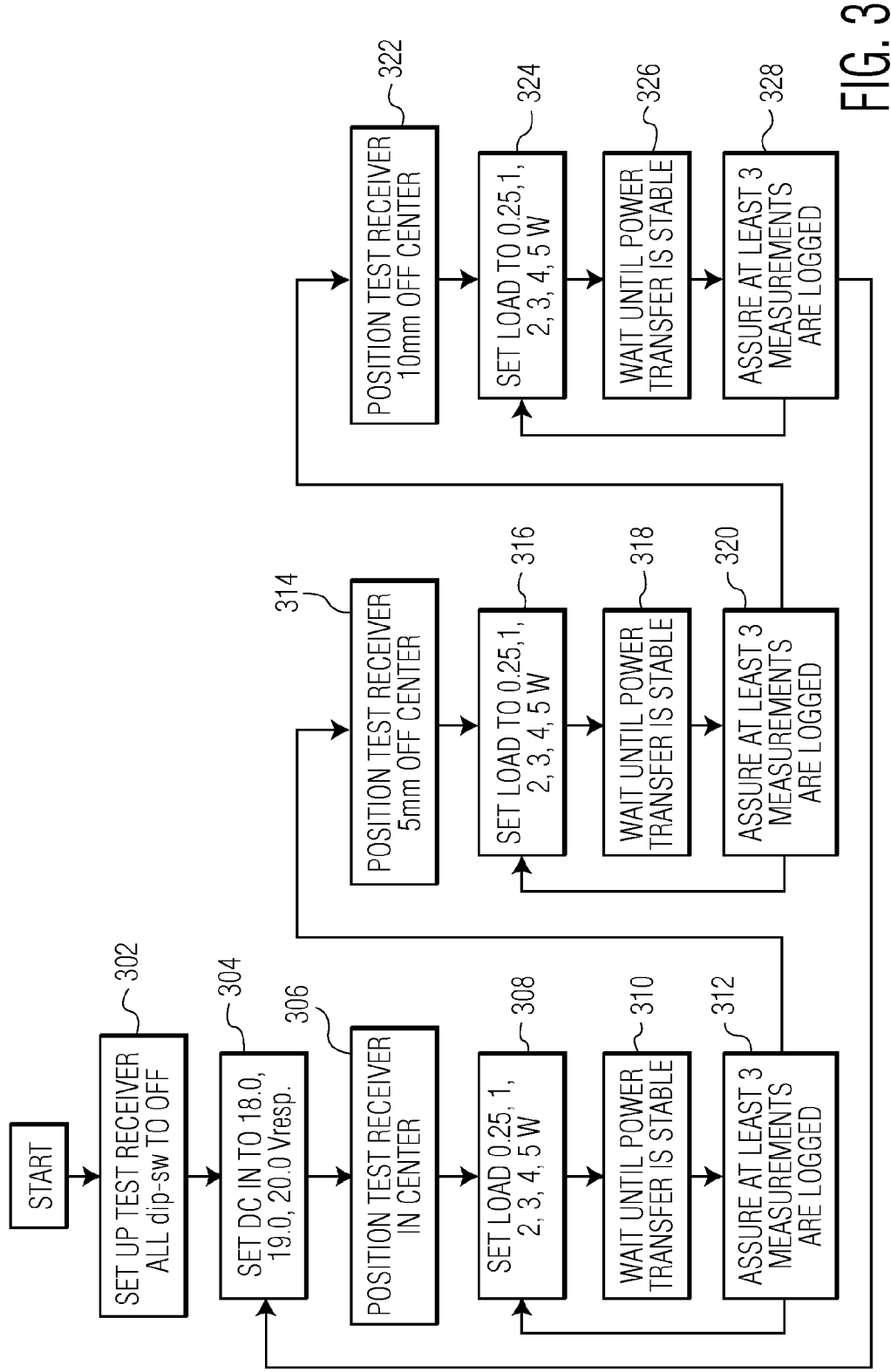
FIG. 3 is a flow chart diagram of a process for collecting measurements used to generate a model for estimating transmitter energy losses.

In an embodiment, in order to perform measurements on an IWPT system, the IWPT system is configured to measure the operating frequency of the power transmitter, the current supplied by the power supply, the voltage supplied by the power supply, the power received by the receiver, and the capacitor voltage of the system. Then, when measuring the IWPT system, the measurements can be logged periodically in, for example, a spreadsheet or as a comma-separated-value (CSV) document for further processing. In an embodiment, measurements are taken at several different combinations of the supply voltage, load size, and position of the mobile device on the base station. FIG. 3 is a flow chart diagram of a process for obtaining measurements used to generate the model for estimating transmitter energy losses. In the processes shown in FIG. 3, a test receiver is used to collect data and measurements. In an embodiment, the test receiver should be able to report the power received to the power transmitter accurately within 10 mW. At block 302, the test receiver is initialized. At block 304, a voltage source is set to 18 volts. At block 306, the test receiver is placed over the center of a power transmitter that is coupled to the voltage source and, at block 308, the load is set to 0.25 watts. At block 310, a period of wait time is allowed to pass until the power transfer is stable (e.g., when three successive log entries reflect similar values). At block 312, at least 3 measurements are logged. In an embodiment, any number of measurements can be logged so long as the measurements are indicative of a stable power transfer. Blocks 308-312 are then repeated with the load set to 1, 2, 3, 4, and 5 watts. At block 314, the test receiver is offset from the power transmitter by 5 mm and then, at blocks 316-320, the load is adjusted similarly to blocks 308-312 and at least three measurements are recorded after power transfer is stable for each adjustment. At block 322, the test receiver is offset from the power transmitter by 10 mm and then, at blocks 324-328, the load is adjusted similarly to blocks 308-312 and at least three measurements are recorded after power transfer stabilizes for each adjustment. Once the last measurement is collected, the process loops back to block 304 and blocks 306-328 are repeated with the source voltage set to 19 volts and again with the source voltage set to 20 volts. After all of the measurements have been collected and logged, the data can be analyzed to remove any outliers or other logged measurements that would cause a curve fit to the data points to be inaccurate. Although the process shown in FIG. 3 utilizes certain voltages, wattages, and distances, other voltages, wattages, and distances could be used.

In an embodiment, once the data points have been logged and erroneous entries have been removed, a Matlab script or other mathematical calculation and simulation tool can be used to perform a curve fitting based on the logged data points. In an embodiment, the curve fitting requires parameters such as a system number and a file and model name to indicate the type of IWPT system, and, optionally, the degree and number of input variables to include in the resulting equation for the curve. The script or other tool then performs the curve fitting. In an embodiment, the script outputs the values of a, b, and c in the equation described above and, if the root mean square error (RMSE) value of the fit is less than 60 mW then the fit is considered a good fit and the output values are used in the model. In other embodiments, an RMSE value of less than 60 mW (e.g., 40 mW) can be used or an RMSE value of greater than 60 mW can be used.

Figure 4:
FIG. 4 depicts a table of output values, root mean square error values, and swing values for curves for a plurality of IWPT systems.

In an embodiment, once the output values are used in the model, the model can be tuned for a specific type of IWPT system. FIG. 4 depicts a table 400 of output values, RMSE values, and swing values for curves for a plurality of IWPT systems. In an embodiment, if the RMSE value is below 50 mW and the swing value is below 150 mW, then the model is acceptable. As depicted in the table of FIG. 4, output values for five types of IWPT systems, as indicated by system index numbers 51-55, are calculated. Because the RMSE values and swing values are all considerably under 50 mW and 150 mW respectively, all of the values in the table depicted in FIG. 4 are acceptable values for use in a model. In another embodiment, it is determined that the values of b and c have very little fluctuation across different IWPT systems and can be fixed. Thus, in an embodiment, the value of a will need to be determined by Matlab or by other mathematical calculation and simulation tools for each IWPT system, while b and c can be presumed constant from system to system.

Figure 5:
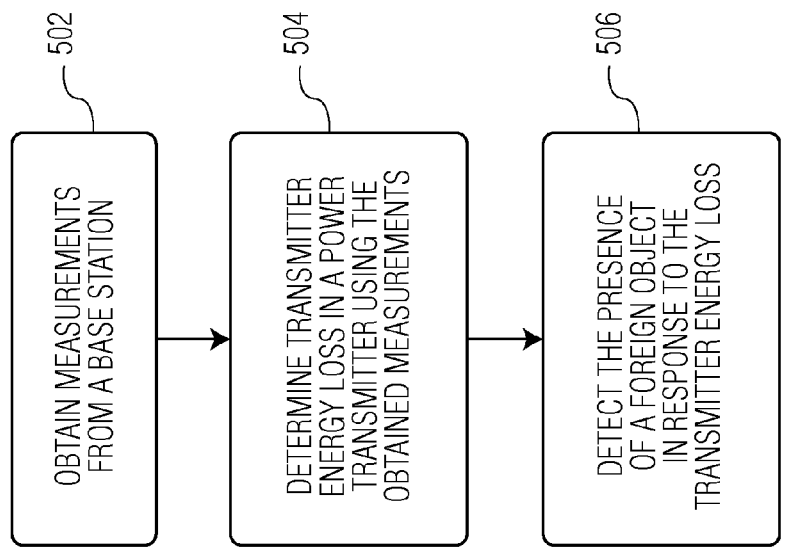
FIG. 5 is a process flow diagram of a method for performing foreign object detection in an inductive wireless power transfer system.

FIG. 5 is a process flow diagram of a method for performing foreign object detection in an inductive wireless power transfer system. At block 502, measurements are obtained from a base station. In an embodiment, the base station is a base station in an IWPT system. At block 504, the measurements are used to determine transmitter energy loss in a power transmitter. In an embodiment, the transmitter energy lost is determined using a two-variable model that is defined by the equation:

$$P_{txloss} \approx a*V_{cap}^2 b*P_{Tx}+c$$

wherein a, b, and c are predetermined coefficients, $V_{cap}$ is the voltage over a capacitor within a power transmitter that is equal to the current amplitude of an inductor in the power transmitter, $P_{Tx}$ is the total power supplied to the power transmitter, and $P_{txloss}$ is the estimated energy loss in the power transmitter. In other embodiments, a model that determines $P_{txloss}$ as a function of $V_{cap}$ and $P_{Tx}$ can be used with any number of additional variables. At block 506, the presence of a foreign object is detected in response to the estimated transmitter energy loss. In an embodiment, the foreign object is detected when the estimated transmitter energy loss is less than the difference between the energy supplied to the power conversion unit of the power transmitter and the energy received by the power receiver. In an embodiment, if the difference between the energy received by the power transmitter less the power lost in the power transmitter (e.g., the input power provided to the power transmitter minus $P_{txloss}$) and the energy received by the power receiver is greater than a certain threshold, charging can be terminated. In an embodiment, the threshold is a value 300 mW.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing foreign object detection in an inductive wireless power transfer system, the method comprising:
    obtaining measurements from a base station of a wireless power transfer system during charging;
    determining transmitter energy loss in a power transmitter, $P_{txloss}$, using the obtained measurements, wherein the transmitter energy loss, $P_{txloss}$, is a function of at least $V_{cap}$ and $P_{Tx}$,
    wherein $V_{cap}$ is proportional to the voltage amplitude across the capacitor of an LC tank circuit in a power transmitter and $P_{Tx}$ is a total power supplied to the power transmitter, and wherein $P_{txloss}$ is determined using a two variable model defined by an equation $a*V_{cap}^2+b*P_{Tx}+c$, wherein $V_{cap}$ and $P_{Tx}$ are the measurements obtained from the base station of the wireless power transfer system; and
    detecting the presence of a foreign object in response to the transmitter energy loss.

2. The method of claim 1, wherein the two-variable model is generated by:
    obtaining measurements of the wireless power transfer system in various operating conditions;
    generating data points based on the measurements; and
    performing curve fitting on the generated data points to generate the predetermined coefficients of the two-variable model.

3. The method of claim 1, further comprising performing a curve fitting by deriving values for the coefficients of the two-variable model such that the resulting curve has a root mean square error value equal to sixty mW or less.

4. The method of claim 1, wherein the presence of a foreign object is detected if $P_{fo}$ exceeds a certain threshold when using the value of $P_{txloss}$ to solve for $P_{fo}$ using the equation:

$$P_{Tx}=P_{txloss}+P_{fo}+(P_{rxloss}+P_{rxload})$$

where $P_{Tx}$ represents the total power supplied to the power transmitter, $P_{txloss}$ represents the losses in the power transmitter itself, $P_{fo}$ represents a power dissipation in a foreign object, $P_{rxloss}$ represents power losses in the power receiver, and $P_{rxload}$ represents a net power delivered to a load.

5. The method of claim 4, wherein the threshold is within 10% of 300 mW.

6. The method of claim 1, wherein at least one of the coefficients of the two-variable model is adjusted based on the type of a coil within of the transmitter.

7. The method of claim 1, wherein the inductive wireless power transfer system is comprised of a Qi transmitter.

8. The method of claim 1, wherein the coefficients b and c are fixed in firmware of the wireless power transfer system.

9. The method of claim 1, wherein $V_{cap}$ is a peak voltage over a capacitor within the power transmitter.

10. An inductive wireless power transfer system, the inductive wireless power transfer system comprising:
    a base station comprising:
        a system unit;
        at least one power transmitter coupled to the system unit, the at least one power transmitter having a power conversion unit and a communications and a control unit;
    wherein the inductive wireless power transfer system is configured to perform foreign object detection, foreign object detection comprising:
        obtaining measurements from a base station of a wireless power transfer system during charging;
        determining transmitter energy loss in a power transmitter, $P_{txloss}$, using the obtained measurements, wherein the transmitter energy loss, $P_{txloss}$, is a function of at least $V_{cap}$ and $P_{Tx}$,
        wherein $V_{cap}$ is proportional to the voltage amplitude across the capacitor of an LC tank circuit in a power transmitter and $P_{Tx}$ is a total power supplied to the power transmitter, and wherein $P_{txloss}$ is determined using a two variable model defined by an equation $a*V_{cap}^2+b*P_{Tx}+c$ wherein $V_{cap}$ and $P_{Tx}$ are the measurements obtained from the base station of the wireless power transfer system; and
        detecting the presence of a foreign object in response to the transmitter energy loss.

11. The system of claim 10, wherein the two-variable model is generated by:
    obtaining measurements of the wireless power transfer system in various operating conditions;
    generating data points based on the measurements; and
    performing curve fitting on the generated data points to generate the two-variable model.

12. The system of claim 10, wherein foreign object detection further comprises performing a curve fitting by deriving values for the coefficients of the two-variable model such that the resulting curve has a root mean square error value equal to sixty mW or less.

13. The system of claim 10, wherein the presence of a foreign object is detected if $P_{fo}$ exceeds a certain threshold when using the value of $P_{txloss}$ to solve for $P_{fo}$ using the equation:

$$P_{Tx}=P_{txloss}+P_{fo}+(P_{rxloss}+P_{rxload})$$

where $P_{Tx}$ represents the total power supplied to the power transmitter, $P_{txloss}$ represents the losses in the power transmitter itself, $P_{fo}$ represents the power dissipation in a foreign object, $P_{rxloss}$ represents the power losses in the power receiver, and $P_{rxload}$ represents the net power delivered to the load.

14. The system of claim 13, wherein the threshold is within 10% of 300 mW.

15. The system of claim 10, wherein the inductive wireless power transfer system is comprised of a Qi transmitter.

16. The system of claim 10, wherein the coefficients b and c are fixed in firmware of the wireless power transfer system.

17. A non-transitory computer-readable storage medium storing instructions to be executed by a computerized system for:
- obtaining measurements from a base station of a wireless power transfer system during charging;
- determining transmitter energy loss in a power transmitter, $P_{txloss}$, using the obtained measurements, wherein the transmitter energy loss, $P_{txloss}$, is a function of at least $V_{cap}$ and $P_{Tx}$,
- wherein $V_{cap}$ is proportional to the voltage amplitude across the capacitor of an LC tank circuit in a power transmitter and $P_{Tx}$ is a total power supplied to the power transmitter, and wherein $P_{txloss}$ is determined using a two variable model defined by an equation $a*V_{cap}^2+b*P_{Tx}+c$ wherein $V_{cap}$ and $P_{Tx}$ are the measurements obtained from the base station of the wireless power transfer system; and
- detecting the presence of a foreign object in response to the transmitter energy loss.

* * * * *